(12) United States Patent
Gubbi (10) Patent No.: US 7,092,374 B1
(45) Date of Patent: Aug. 15, 2006

(54) ARCHITECTURE FOR A WIRELESS AREA NETWORK NODE

(75) Inventor: Rajugopal R. Gubbi, Fair Oaks, CA (US)

(73) Assignee: Cirrus Logic, Inc., Austin, TX (US)

( * ) Notice: Subject to any disclaimer, the term of this patent is extended or adjusted under 35 U.S.C. 154(b) by 992 days.

(21) Appl. No.: 09/671,960

(22) Filed: Sep. 27, 2000

(51) Int. Cl.
 *H04Q 7/24* (2006.01)
(52) U.S. Cl. .................. 370/338; 370/463; 370/469
(58) Field of Classification Search ............... 370/338,
 370/349, 352–356, 401, 469, 328, 310.2,
 370/351, 357, 465, 466, 310, 254, 463; 707/226,
 707/223–225, 229, 230, 235, 238, 249, 206,
 707/203, 245, 220, 227, 228, 250
 See application file for complete search history.

(56) References Cited

U.S. PATENT DOCUMENTS

| | | | | |
|---|---|---|---|---|
| 5,630,061 | A * | 5/1997 | Richter et al. ............... | 709/227 |
| 5,638,371 | A * | 6/1997 | Raychaudhuri et al. .. | 370/310.2 |
| 5,684,791 | A * | 11/1997 | Raychaudhuri et al. .. | 370/310.2 |
| 5,774,461 | A * | 6/1998 | Hyden et al. ............ | 370/310.2 |
| 5,787,080 | A * | 7/1998 | Hulyalkar et al. ........ | 370/310.2 |
| 6,256,300 | B1* | 7/2001 | Ahmed et al. ............... | 370/331 |
| 6,327,254 | B1* | 12/2001 | Chuah ........................ | 370/328 |
| 6,542,490 | B1* | 4/2003 | Ahmadvand et al. ....... | 370/338 |
| 6,640,248 | B1* | 10/2003 | Jorgensen ................... | 709/226 |

FOREIGN PATENT DOCUMENTS

EP 0 789 468 A 8/1997

OTHER PUBLICATIONS

Trotter, J. et al; A Wireless Adapter Architecture for Mobile Computing; Proceedings of the Usenix Mobile and Location—Independent Computing Symposium; Apr. 10, 1995; XP000675147, pp. 25-31.

Drabu Yasir; A Survey of QoS Techniques in 802.11; Department of Computer Science, Kent State University; Jan., 1999; XP002209851 ; pp. 1-11.

AT&T, Lucent, Sharewave; IEEE 802.11 QoS MAC Enhancements Joint Proposal; IEEE; May 1, 2000, XP002209850; pp. 1-50.

* cited by examiner

*Primary Examiner*—Ajit Patel
(74) *Attorney, Agent, or Firm*—James J. Murphy; Thompson & Knight LLP (57) ABSTRACT

A medium access control (MAC) layer for a node of a wireless local area network, which may be used in embedded, host and stand-alone applications, includes a hardware layer and a software layer. The hardware layer is configured to perform time-critical tasks and the software layer is configured to perform non-time critical tasks. The software layer includes multiple modules, such as one or more of a host communication agent, a bridging layer, a network management support module, a SBM-to-TAME conversion module, and a rate estimation module. Further, the software layer acts as the source of and the destination of MAC Service Data Units and is configured as a hierarchical structure in which functional unit blocks for associated elements of the hardware layer communicate with an application layer through respective device drivers and managers. Device drivers and managers communicate through a device manager layer.

13 Claims, 6 Drawing Sheets

ARCHITECTURE FOR A WIRELESS AREA NETWORK NODE

FIELD OF THE INVENTION

The present invention relates to the field of wireless computer networks and, in particular, to the hardware and software architectures for a node to be used in such a network, especially where the network operates according to the protocol specified in the IEEE Standard 802.11, and variants thereof.

BACKGROUND

The Institute of Electrical and Electronic Engineers (IEEE) manages most of the worldwide standards for computer local area networks (LANs) and its IEEE 802.11 Standard represents the first standard for wireless LAN (WLAN) products. The majority of the WLAN products available in the marketplace today are proprietary spread spectrum solutions targeting vertical applications operating in the 900 MHz and 2.4 GHz frequency bands. These products include wireless adapters and access points in PCMCIA, ISA and custom PC board platforms. Proprietary solutions for some applications are beneficial, especially for those requiring market differentiation or customization of a wireless LAN network. However, proprietary solutions are typically customized and constrain end users into purchasing products from a single equipment supplier. The advantage of standards-based products is that users can choose from a number of vendors that provide compatible products. This increases competition and provides the potential for lower cost products. Thus, interoperability, low cost and stimulation of market demand are some of the advantages that standards-based solutions offer.

The IEEE 802.11 standard defines the protocol for two types of networks: Ad-hoc and client/server networks. An Ad-hoc network is a simple network where communications are established between multiple stations in a given coverage area without the use of an access point or server. The standard specifies the etiquette or protocol that each station must observe so that they all have fair access to the wireless communication link. It also provides schemes for arbitrating requests to use the communication link to ensure that throughput is maximized for all users. In contrast, client/server networks use an access point that controls the allocation of bandwidth (i.e., transmission times) for all stations. The access point may also be used to handle traffic to and from a wired or wireless backbone. This arrangement allows for point coordination of all of the stations in the network and ensures proper handling of the data traffic as the access point routes data between the stations and to and from the network. Typically WLANs controlled by a central access point will provide better throughput performance.

The IEEE 802.11 standard does not specify technology or implementation but simply provides specifications for the physical layer and Media Access Control (MAC) layer of a network. The standard thus allows for manufacturers of wireless LAN radio equipment to build interoperable network equipment, while still providing design freedom for these vendors to choose desired implementations.

The physical layer (or phy) in any network defines the modulation and signaling characteristics for the transmission of data. At the physical layer of an 802.11-compliant network, two RF (radio frequency) and one infrared transmission methods are defined. For purposes of this discussion, only the RF methods are considered, but in general the schemes described herein may be equally applicable to infrared transmissions. Operation of a WLAN in unlicensed RF bands requires the use of spread spectrum modulation to meet the requirements for operation in most countries. The RF transmission standards set forth in the 802.11 standard are Frequency Hopping Spread Spectrum (FHSS) and Direct Sequence Spread Spectrum (DSSS). Both architectures are defined for operation in the 2.4 GHz frequency band, typically occupying the 83 MHz of bandwidth from 2.400 GHz to 2.483 GHz. Differential band phase shift keying (DBPSK) and differential quadrature phase shift keying (DQPSK) are the modulation techniques employed for the DSSS networks. Frequency hopping networks use 2–4 level Gaussian FSK (frequency shift keying) as the modulation signaling method. The physical layer data rate for FHSS systems is 1 Mbps. For DSSS systems both 1 Mbps and 2 Mbps data rates are supported. The choice between FHSS and DSSS will depend on a number of factors related to the users application and the environment that the system will be operating within.

The DSSS physical layer uses an 11-bit Barker code Sequence to spread the data before it is transmitted. Each bit transmitted is modulated by the 11-bit sequence. This process spreads the RF energy across a wider bandwidth that would be otherwise required to transmit the raw data. The processing gain of the system is defined as 10x the log of the ratio of spreading rate (also know as the chip rate) to the data. The receiver "despreads" the received signal to recover the original data. The advantage of this technique is that it reduces the effect of narrowband sources of interference. The spreading architecture used in the direct sequence physical layer should not be confused with code division multiple access (CDMA) networks. All 802.11 compliant products utilize the same pseudorandom (PN) code and therefore do not have a set of codes available as is required for CDMA operation.

The FHSS physical layer has 22 hop patterns to choose from. The frequency hop physical layer is required to hop across the 2.4 GHz band covering 79 channels. Each channel occupies 1 Mhz of bandwidth and transmitters must hop at a specified minimum rate (2.5 hops per second in the United States). Each of the physical layers use their own unique header to synchronize with the receiver and to determine the signal modulation format and data packet length. The physical layer headers are always transmitted at 1 Mbps. Predefined fields in the headers provide the option to increase the data rate to 2 Mbps for the actual data packet.

The MAC layer specification for the 802.11 standard has similarities to the 802.3 Ethernet wired line standard. 802.11 networks use a protocol scheme know as carrier-sense, multiple access, collision avoidance (CSMA/CA). This protocol seeks to avoid data collisions instead of detecting them such as the algorithm used in the 802.3 standard. It is difficult to detect collisions in an RF transmission network and it is for this reason that collision avoidance is used.

The MAC layer operates together with the physical layer by sampling the energy over the medium transmitting data. The physical layer uses a clear channel assessment (CCA) algorithm to determine if the channel is clear. This is accomplished by measuring the RF energy at the antenna and determining the strength of the received signal. This measured signal is commonly known as RSSI. If the received signal strength is below a specified threshold the channel is declared clear and the MAC layer is given the clear channel status for data transmission. If the RF energy is above the threshold, data transmissions are deferred in accordance with the protocol rules.

The standard provides another option for CCA that can be used in place of or together RSSI measurement. Carrier sense can be used to determine if the channel is available. This technique is more selective because it verifies that the signal is the same carrier type as 802.11 transmitters. The best method to use depends upon the levels of interference in the operating environment.

The CSMA/CA protocol allows for options the can minimize collisions by using request to send (RTS), clear-to-send (CTS), data and acknowledge (ACK) transmission frames, in a sequential fashion. Communications are established when one of the wireless nodes sends a short message RTS frame. The RTS frame includes the destination and the length of message. The message duration is known as the network allocation vector (NAV). The NAV alerts all others in the network, to back off the communication link for the duration of the transmission. The receiving station issues a CTS frame which echoes the senders address and the NAV. If the CTS frame is not received, it is assumed that a collision occurred and the RTS process starts over. After the data frame is received, an ACK frame is sent back verifying a successful data transmission.

A common limitation with wireless LAN systems is the "hidden node" problem. This can disrupt a significant volume of the communication traffic in a highly loaded LAN environment. It occurs when there is a station in a service set that cannot detect the transmission of another station to detect that the media is busy. In such cases two or more stations that are unaware of one another's transmissions may try to transmit at the same time to another station that can "hear" more than one of the transmitting stations. The use of RTS, CTS, Data and ACK sequences helps prevent the disruptions caused by this problem.

Thus, the 802.11 standard defines practices that ensure network interoperability, however, as indicated above, the standard does not specify any particular implementation details. For example, the 802.11 standard makes no mention of how protocol functions should be divided between hardware and software operations in an 802.11 compliant product. Such decisions are left to product vendors.

SUMMARY OF THE INVENTION

A medium access control (MAC) layer for a node of a wireless local area network, which may be used in embedded, host and stand-alone applications, includes a hardware layer and a software layer. The hardware layer is configured to perform time-critical tasks and the software layer is configured to perform non-time critical tasks. The software layer includes multiple modules, such as one or more of a host communication agent, a bridging layer, a network management support module, a SBM-to-TAME conversion module, and a rate estimation module. Further, the software layer acts as the source of and the destination of MAC Service Data Units and is configured as a hierarchical structure in which functional unit blocks for associated elements of the hardware layer communicate with an application layer through respective device drivers and managers. Device drivers and managers communicate through a device manager layer. In a host-based configuration, all communication layers above the MAC layer run on a host.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A system (e.g., hardware and software) architecture for wireless local area network devices is disclosed herein. More specifically, examples of hardware and software functionality (and division of labor there between) for Quality of Service (QoS)-based computer network devices that incorporate 802.11-compliant MACs are discussed herein. Although discussed with reference to certain illustrated embodiments, upon review of this specification, those of ordinary skill in the art will recognize that the present architecture and the devices built upon such architecture may find application in a variety of systems. Therefore, in the following description the illustrated embodiments should be regarded as exemplary only and should not be deemed to be limiting in scope.

The following abbreviations are used throughout this discussion:
CP: Contention period
CFP: Contention free period
ASIC: Application specific integrated circuit
FUB: Functional unit block in an ASIC
PC: Point coordinator
EPC: Enhanced PC that supports multimedia streams
STA: Station
ESTA: Enhanced STA that supports multimedia streams
SMAC: A MAC hardware accelerator for the 802.11 protocol in an ASIC
SITARA: A MAC hardware accelerator for the 802.11e (multimedia) protocol in an ASIC The following terminology is used throughout this discussion:
Device/node: same as station (as that term is used in the 802.11 standard).
Firmware/software: a computer-readable set of instructions or program that is executed by a control processor, including drivers and other functions.
Driver: an agent in the software responsible for the operation of a particular FUB in an ASIC.

Host software: a set of computer-readable instructions (i.e., a program) that is executed by a host processor including drivers and applications Host driver: an agent in the host software responsible for the operation of a particular interface with other hardware attached to the host.

Host protocol driver: a driver in the host software responsible for providing 802.11e protocol related support on the host processor.

The system architecture described herein is intended for use with 802.11e-compliant devices with support for multimedia streaming and Quality of Service (QoS) as detailed in the 802.11e standard promulgated by the IEEE. More specifically, the devices described herein include an ASIC with enhancements to the 802.11 MAC, called SMAC, to support the proposed IEEE 802.11e standard. The ASIC includes a FUB configured to provide support for QoS operations; this FUB is referred to as a SITARA. The software running on the ASIC includes a MAC layer, a bridging layer, network management support and other product-related segments such as an Ethernet driver, a PCI/PCMCIA/USB driver, Flash ROM support for configuration information storage, etc. This description addresses both a host-based and embedded application of the proposed scheme.

In general NICs (network interface cards), bridges and gateway products can be realized using either of these configurations. While a NIC constitutes a host-based application, a bridge is an embedded application. A gateway can be realized either as a host-based application, e.g., using a two-processor approach, or as an embedded application, e.g., using just an ASIC for both MAC and higher layer operations. These different applications are described in more detail below.

Figure 1:
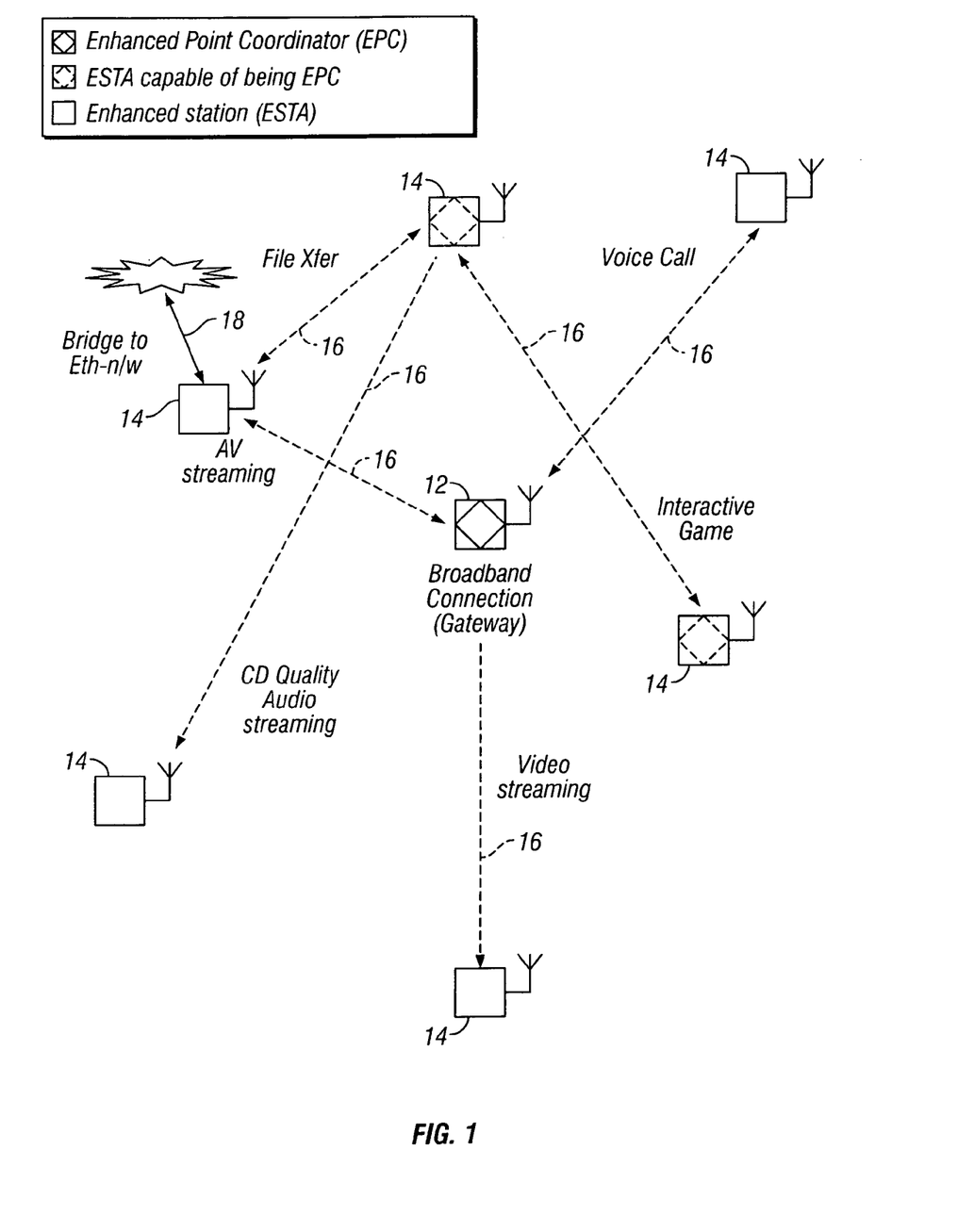
FIG. 1 illustrates a topology/connectivity diagram showing an example scenario for wireless local area network devices configured in accordance with an embodiment of the present invention.

Now referring to FIG. 1, a connectivity diagram with target/example applications for WLAN devices configured in accordance with the present scheme is shown. As indicated, target platforms include enhanced stations (i.e., stations that comply with the 802.11 standard and that are enhanced for multimedia operations in accordance with the schemes described herein), enhanced stations capable of being enhanced point coordinators, and enhanced point coordinators themselves. Such devices may be employed in a WLAN 10 as a gateway 12 or other node 14, one or more of which may act as a bridge to other networks (e.g., via Ethernet connections). Because the nodes are configured for multimedia operations, applications such as streaming video and/or audio, and interactive game playing may be supported, as well as more traditional applications such as file transfer and voice transport. All communications between nodes take place over wireless links 16. Bridging operations may utilize wired or wireless links 18.

Within the nodes 12 and 14, the functions of the 802.11e MAC may be implemented partly in software and partly in hardware. In one embodiment, a preferred practice is to implement any function that is time critical in the 802.11e protocol in hardware, thus achieving predictable timing and making the software easier to write, maintain and enhance. For purposes of such embodiments, events that require a response within a few hundred microseconds (μs) and/or occur more frequently than say 500 times per second (i.e., within a 2 msec interval) may be considered time critical.

A MAC hardware accelerator configured in accordance with the present teachings (SITARA) should support the transmission of sequences of multimedia protocol data units (MPDUs), together with related timing, without any frame-by-frame software interaction. At the same time, the hardware should not have the burden of additional buffering, other than what is already provided by software, of the entire frames' data before transmission. The MAC-module in software interacts with the MAC hardware to prepare queues of frames to transmit, analyze and deliver the received frames. The 802.11 e retry rules, segmentation and reassembly, timing generation and management functions are performed largely in software.

Figure 2:
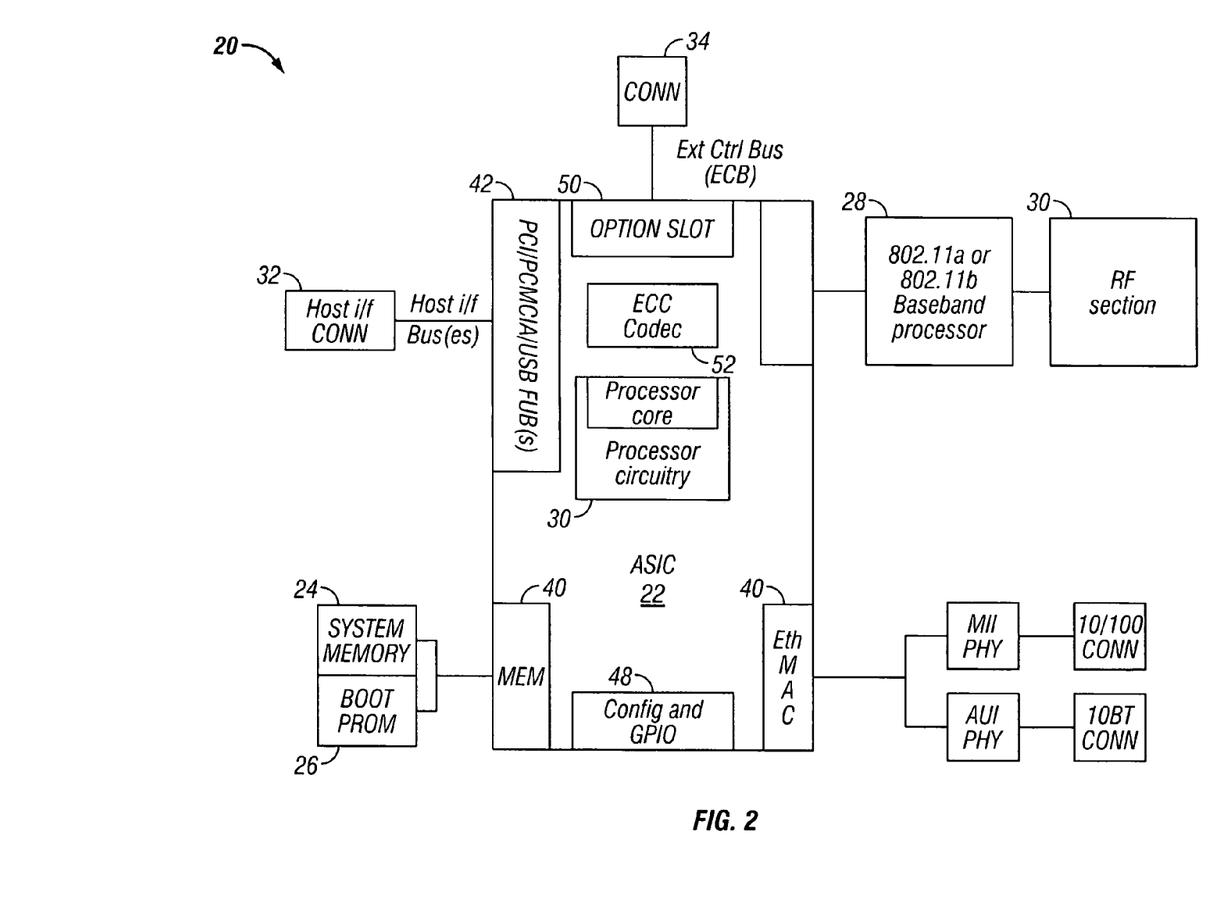
FIG. 2 illustrates a hardware block diagram layout for wireless local area network devices configured in accordance with an embodiment of the present invention.

With these partitions between software and hardware functionality in mind, a hardware block diagram for a WLAN device 20 configured in accordance with the present invention is shown in Error! Reference source not found. The device 20 includes an ASIC 22, system memory (e.g., RAM) 24, boot/configuration memory (e.g., flash-ROM or PROM) 26, a baseband processor (e.g., to provide 802.11a or 802.11b functionality/compatibility) 28, an RF section 30, a host interface 32, and an external control bus interface 34. Other components such as Ethernet Phys and related connectors 36 may also be provided. The baseband processor 28 and the RF section 30 may either be provided on the same circuit board as the ASIC 22 or they may be provided as part of a daughter radio board attached to a circuit board which includes ASIC 22.

ASIC 22 includes a control processor core (e.g., an ARM processor core as is customary in ASIC applications) and related circuitry 38, a memory controller 40, and various functional unit blocks (FUBs) for PCI/PCMCIA/USB ports 42, Ethernet ports 44, and the 802.11e MAC 46. The ASIC 22 may also include a configuration and general purpose input/output (GPIO) port 48 for functions such as a status display through one or more LEDs, and an external connector bus (ECB) interface 50 that can be used to provide support for other devices such as a second Ethernet connection, an HPNA connection, or other MACs such as HiperLan2 and IEEE-1394. Further, an error correction codec 54 may be included. Internal busses (not shown) couple the elements of ASIC 22 to the host processor core 38 in the customary fashion.

Figure 3:
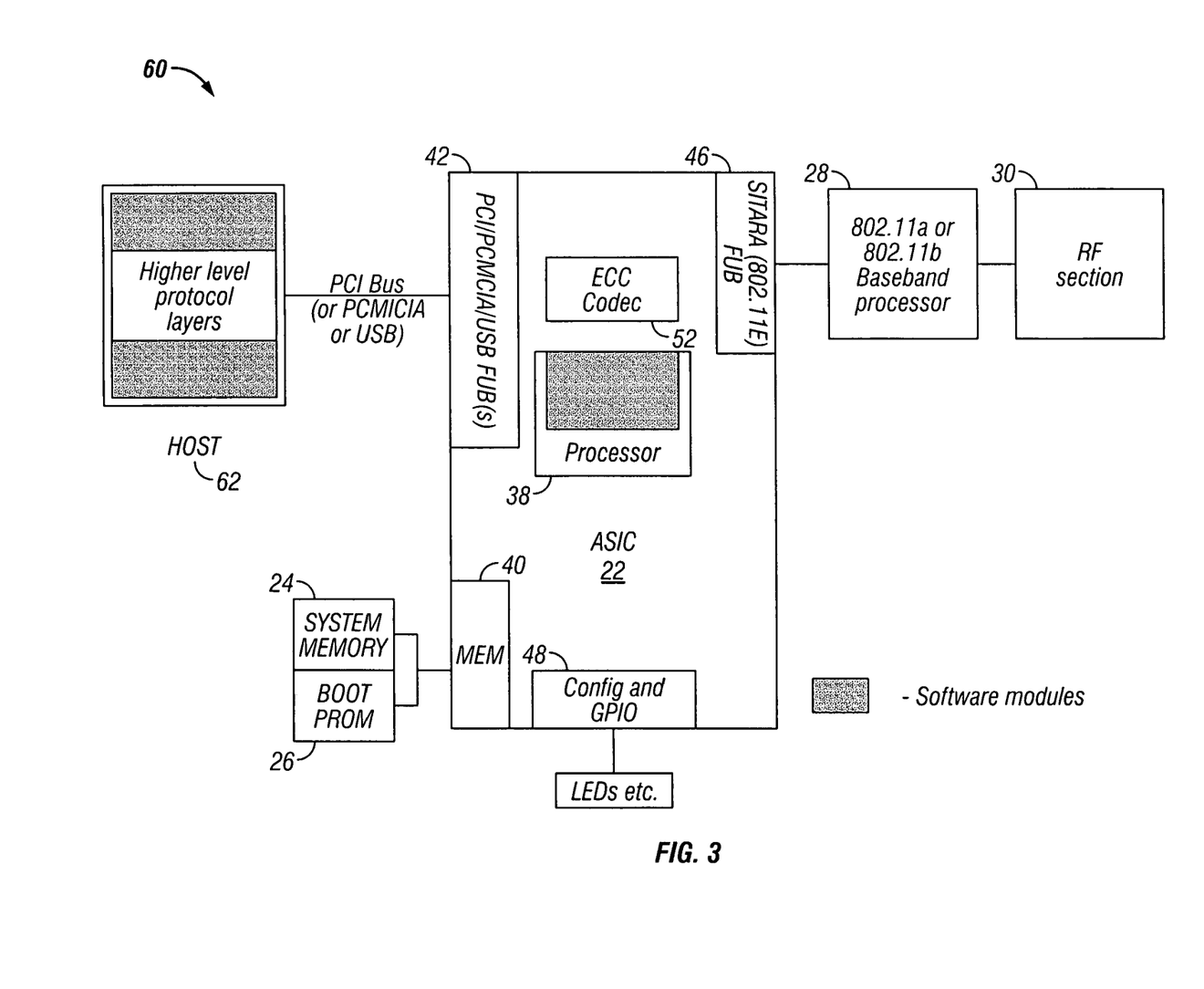
FIG. 3 illustrates a system block diagram for a host-based application of an 802.11e MAC for wireless local area network devices configured in accordance with an embodiment of the present invention.

Not all WLAN devices are stand-alone devices. In some cases, WLAN devices are host-based products. A network interface card (NIC) is a good example of a host-based application for WLAN devices configured in accordance with the present invention. A NIC is always attached to a host and provides 802.11e wireless network interface to that host. A personal computer is an example of a host in this configuration. Hence, the NIC is composed of an ASIC 22, a NIC hardware board, software (illustrated as a firmware application and MAC module) for ASIC 22, an NDIS (or similar) driver (usually found in the host) and the network management software (also found in the host). The system block diagram for a NIC 60 with personal computer as host 62 is shown in Error! Reference source not found. All communication layers above the MAC (such as TCP/IP and higher layers) are envisaged to be running on the host 62.

At the top layer of the 802.11e MAC module, communication is carried out through a MAC application programming interface (API). The MAC API is appropriately programmed by the software application. The software application layer consists of multiple modules including a host communication agent, network management support, SBM-to-TAME conversion, rate estimation module, etc. Conceptually the software application can be seen as the source of and the destination of MAC Service Data Units (MSDUs) from the 802.11e MAC.

The host 62 supports an NDIS driver, which may be a thin layer passing frames between the host and the NIC, and making basic MAC management decisions. The network management software may be an application program running on the host 62, which helps in device installation and device management. Note that in a Gateway product implemented using two processors, one host processor may be used for router applications and an ASIC 22 may be used as a wireless interface. In the illustrated application, the host processor 62 runs the software necessary for network management and provides a driver that is functionally similar to an NDIS driver for communication with the NIC.

Figure 4:
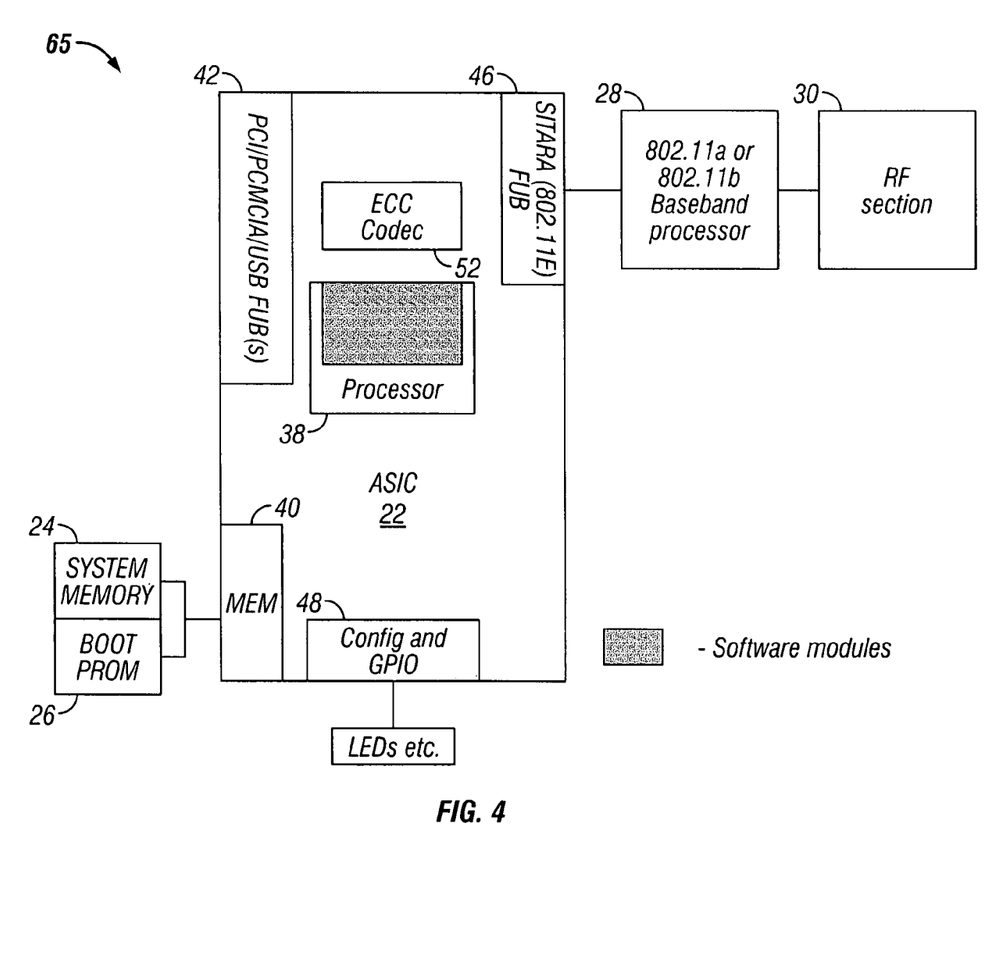
FIG. 4 illustrates a system block diagram for an embedded application of an 802.11e MAC for wireless local area network devices configured in accordance with an embodiment of the present invention.

In addition to host-based applications, embedded applications of the present MAC may also be used. A bridge is a good example of an embedded application of the MAC. A bridge is a layer-2 device connecting a wired network (e.g., either Ethernet or HPNA) to an 802.11e (i.e., wireless) network. There is no host assumed for this configuration. Hence, a bridge application 65 includes an ASIC 22, a hardware board, and software for ASIC 22 including the 802.11e MAC module and the network management module. The system block diagram for a bridge 65 is shown in Error! Reference source not found. No communication layers above the MAC (such as TCP/IP) are assumed to be running on the processor core 38. For a gateway device implemented using single ASIC 22, as an embedded application, the higher layers are present and running on ASIC 22.

The software application layer for the bridge 65 includes a bridging module and embedded network management module along with the modules such as SBM, if necessary, SBM-to-TAME conversion, rate estimation, etc. that were present in the NIC configuration. Along with these modules, the software in a bridge 65 contains a driver for the Ethernet FUB instead of the driver for the host interface FUB. As in the host-based application, the software application can be considered the source of and the destination of MSDUs.

In general, all control frames received across the 802.11e MAC are handled by the hardware upon reception and all frames to be transmitted are constructed by the software, except those control frames (CF) and acknowledgement (Ack) frames transmitted as immediate responses (within xIFS) to the received frames. These latter control and ack frames are constructed by the hardware. As part of this process, a CF-Ack notification (or a failure notification) is provided from hardware to software as applicable.

Figure 5:
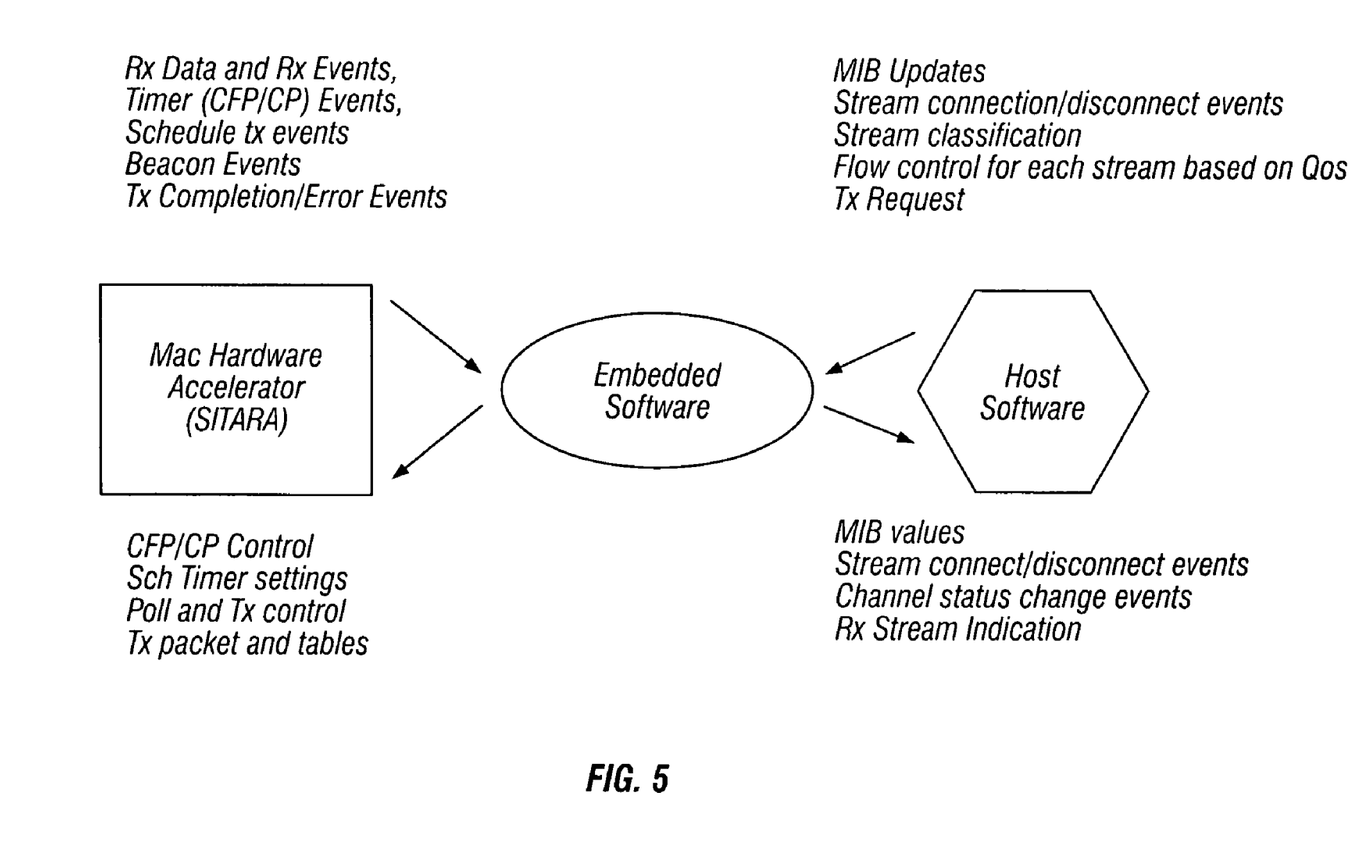
FIG. 5 is a software context diagram for wireless local area network devices configured in accordance with an embodiment of the present invention.

The software context diagram for the present scheme is shown in Error! Reference source not found. The hardware accelerator (SITARA) performs the time critical tasks and expects the rest of the tasks to be performed either in the embedded software or in the host software. The hardware does not take inter-packet decisions by itself unless it is instructed to do so. Hence, the embedded software is expected to provide all the control information to the hardware and additionally indicate the action to be taken in cases such as a transmission failure. This control information may be included in a transmit-frame-header structure defined for SITARA and some of the action information could be passed in control registers of SITARA.

Thus, the hardware accelerator passes received information such as data and events, including timer events (time outs and the like), scheduled transmission events and completion reports/errors and beacon events to the embedded software. In return, the embedded software passes CFP/CP control messages, timer settings, poll and transmission control information and the actual packets for transmission to the hardware. The embedded and host processor software layers exchange MIB updates and values, stream connect/disconnect information, channel information, flow control information and transmission and reception information between one another. The MAC software thus communicates with two entities: the MAC hardware and the host. Hence, the external interfaces to the MAC software are the MAC hardware interfaces and the host interfaces.

As shown, the host is the source of new MIB updates, transmission requests and the stream connect/disconnect events arising out of reception of RSVP-like signaling packets. The embedded software provides receive indications, values of MIB variables, channel status changes and the stream connect/disconnect events arising out of events within the MAC or upon such instruction from EAP/EPC. The host software includes a host software driver (e.g., an NDIS driver on a Windows environment) and a network management application. The host software driver includes interfaces to higher layers, a D/SBM layer and a hardware abstraction layer to interface with the ASIC. In order to make the best use of the streaming support in the 802.11e standard, the host software driver should be capable of stream classification. Hence, depending on the QoS requirement it should be possible to flow control each stream differently over the hardware interface to the ASIC.

Figure 7:
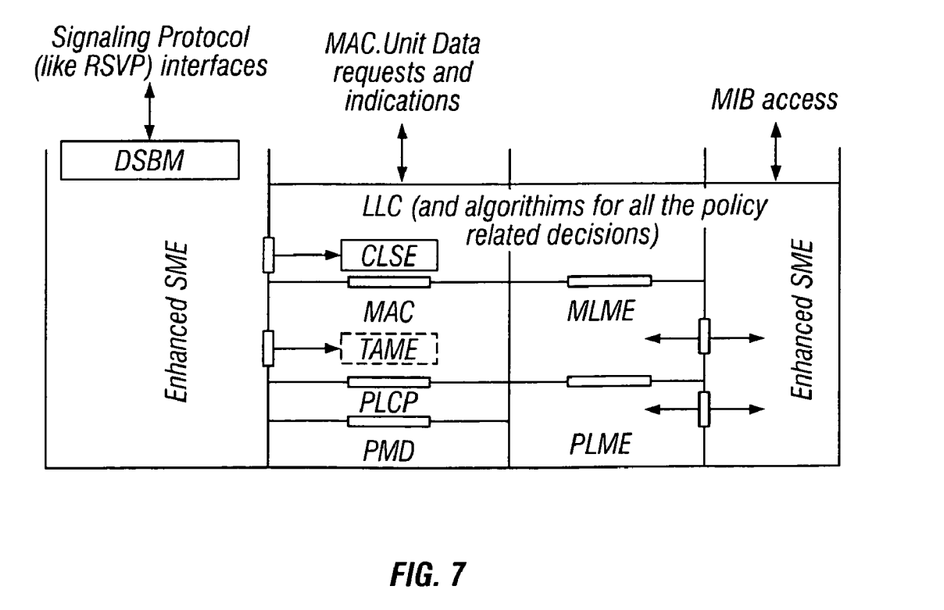
FIG. 7 illustrates the relationships between different layers within a MAC for wireless local area network devices configured in accordance with an embodiment of the present invention.

The MAC hardware is the source of received data and a number of different types of events, such as a receive packet event, transmit failure/success events and timer events. The MAC software provides formatted packets and additional control, if needed, in the hardware registers so that the hardware can transmit a sequence of frames. Hence on the transmit side, it is the responsibility of the MAC software to deal with all the management frames, segmentation, stream/priority classification, packet queuing and ordering, into a transmit table for the hardware. The hardware will then perform the transmit operations according to the information in the table. On the receive side, the MAC software handles tasks like constructing delayed-Ack frames and delivering data packets to the host. Additionally the MAC software performs all non-time-critical tasks such as stream connection/disconnection process, channel status estimation/analysis, time allocation per D/SBM request, etc. FIG. 7 illustrates relationships between these different layers within the MAC.

Figure 6:
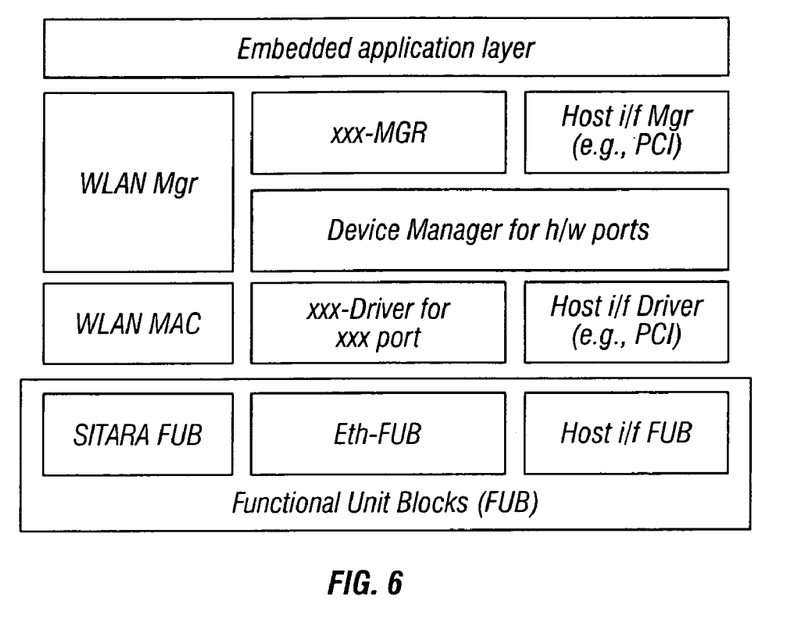
FIG. 6 illustrates an exemplary architecture for embedded software for wireless local area network devices configured in accordance with an embodiment of the present invention.

The embedded software includes the MAC module, an embedded application layer and a host interface. An architecture for the embedded software for the ASIC is shown in Error! Reference source not found. The figure also shows the possibility of other device drivers (such as an Ethernet driver) that can be present in the embedded software. For a host-based application, all the other ports are absent.

As shown, the device drivers interface with the hardware FUBs on one side and with their respective manager entities through the device manager layer on the other side. The device manager provides uniform interfaces so that the device driver and its manager can be developed in parallel. The embedded application layer for a host-based application includes connections between the host interface manager and the WLAN manager.

Thus, a system architecture for wireless local area network devices has been described. Although the foregoing description and accompanying figures discuss and illustrate specific embodiments, it should be appreciated that the present invention is to be measured only in terms of the claims that follow.

What is claimed is:

1. A medium access control (MAC) layer for a node of a wireless local area network, comprising a hardware layer and a software layer, the hardware layer being configured to perform time-critical tasks and the software layer being configured to perform non-time critical tasks, wherein the software layer comprises multiple modules including one or more of a host communication agent, a bridging layer, a network management support module, a SBM-to-TAME conversion module, and a rate estimation module.

2. The MAC layer of claim 1 wherein the software layer acts as the source of and the destination of MAC Service Data Units.

3. The MAC layer of claim 1 configured for use in an embedded application.

4. The MAC layer of claim 1 configured for use in a stand-alone application.

5. The MAC layer of claim 1 configured for use in a host-based application.

6. The MAC layer of claim 5 wherein all communication layers above the MAC layer are configured to run on a host.

7. A medium access control (MAC) layer for a node of a wireless local area network, comprising a hardware layer and a software layer, the hardware layer being configured to perform time-critical tasks and the software layer being configured to perform non-time critical tasks, wherein the software layer is configured as a hierarchical structure in which functional unit blocks for associated elements of the hardware layer communicate with an application layer through respective device drivers and managers.

8. The MAC layer of claim 7 wherein the device drivers and managers communicate through a device manager layer.

9. The MAC layer of claim 7 wherein the software layer acts as the source of and the destination of MAC Service Data Units.

10. The MAC layer of claim 7 configured for use in an embedded application.

11. The MAC layer of claim 7 configured for use in a stand-alone application.

12. The MAC layer of claim 7 configured for use in a host-based application.

13. The MAC layer of claim 7 wherein all communication layers above the MAC layer are configured to run on a host.

* * * * *